(12) United States Patent
McLean et al.

(10) Patent No.: US 11,436,503 B1
(45) Date of Patent: Sep. 6, 2022

(54) SYSTEMS, METHODS, GAMES AND RELATED MACHINE READABLE PROGRAMS FOR RECOMMENDING DRINKING VESSELS AND INFUSIBLE MATERIALS

(71) Applicant: ESPRO, Inc., Vancouver (CA)

(72) Inventors: Christopher R. McLean, Vancouver (CA); Bruce A. Constantine, North Attleboro, MA (US)

(73) Assignee: Espro, Inc., Vancouver (CA)

( * ) Notice: Subject to any disclaimer, the term of this patent is extended or adjusted under 35 U.S.C. 154(b) by 754 days.

(21) Appl. No.: 16/420,532

(22) Filed: May 23, 2019

Related U.S. Application Data

(63) Continuation-in-part of application No. 29/648,776, filed on May 23, 2018, now Pat. No. Des. 871,142.

(60) Provisional application No. 62/675,746, filed on May 23, 2018.

(51) Int. Cl.
 *G06N 5/04* (2006.01)
 *A63F 9/18* (2006.01)
 *A47J 31/52* (2006.01)

(52) U.S. Cl.
 CPC .............. *G06N 5/04* (2013.01); *A47J 31/52* (2013.01); *A63F 9/183* (2013.01); *A63F 2009/186* (2013.01)

(58) Field of Classification Search
 USPC .......................................... 706/11
 See application file for complete search history.

(56) References Cited

U.S. PATENT DOCUMENTS

| 4,733,863 | A  | * | 3/1988 | Novotny | .............. | A23G 1/50 |
| | | | | | | 426/112 |
| 2015/0060453 | A1 | * | 3/2015 | Rahimi | .................. | C12G 3/00 |
| | | | | | | 220/796 |
| 2016/0185516 | A1 | * | 6/2016 | Rahimi | .................. | B65D 25/54 |
| | | | | | | 426/110 |

* cited by examiner

*Primary Examiner* — Pierre E Elisca
(74) *Attorney, Agent, or Firm* — Winthrop & Weinstine, P.A.

(57) ABSTRACT

The present disclosure provides systems, methods and machine readable programs. In some implementations, the systems, methods and machine readable programs can be used for selecting coffee cups or mugs of particular shapes with the objective of accentuating particular flavor notes in coffee as experienced by a user. In further implementations, the systems, methods and machine readable programs can be used for recommending an infusible extract based on a drinking vessel.

18 Claims, 4 Drawing Sheets

SYSTEMS, METHODS, GAMES AND RELATED MACHINE READABLE PROGRAMS FOR RECOMMENDING DRINKING VESSELS AND INFUSIBLE MATERIALS

CROSS-REFERENCE TO RELATED APPLICATIONS

The present patent application claims the benefit of priority to U.S. Patent Application Ser. No. 62/675,746, filed May 23, 2018. The present patent application is a continuation in part of and claims the benefit of priority to U.S. patent application Ser. No. 29/648,776, filed May 23, 2018. Each of the foregoing patent application is incorporated by reference herein in its entirety for any purpose whatsoever.

COPYRIGHT NOTICE

This application for letters patent discloses and describes various novel innovations and inventive aspects of coffee sampling technology (hereinafter "disclosure") and contains material that is subject to copyright, mask work, or other intellectual property protection. The respective owners of such intellectual property have no objection to the facsimile reproduction of the disclosure by anyone as it appears in published Patent Office file/records, but otherwise reserve all rights.

FIELD

The present innovations generally address apparatuses, methods, and systems for identifying, learning, suggesting, and reinforcing meaningful associations between flavor notes in beverages, such as coffee, and drinking vessels for drinking beverages, such as cups, mugs, tumblers, flutes, and the like.

However, in order to develop a reader's understanding of the innovations, descriptions have been compiled into a single disclosure to illustrate and clarify how aspects of these innovations operate independently, interoperate as between individual innovations, or cooperate collectively. The application goes on to further describe the interrelations and synergies as between the various innovations; all of which is to further comply with 35 U.S.C. § 112.

BACKGROUND

The roasting and brewing of coffee can be a complex process. Depending on the type of coffee bean, where it is grown, the conditions under which it is grown, and the manner in which the bean is roasted, will create myriad different flavor profiles and flavor notes in coffee. In fact, coffee contains a tremendous number of chemicals, with over 1000 aroma compounds alone. Depending on roasting conditions, some of these aromatic compounds can be accentuated. The presently disclosed embodiments provide improvements in the state of this art, as set forth below.

SUMMARY

Advantages of the present disclosure will be set forth in and become apparent from the description that follows. Additional advantages of the disclosure will be realized and attained by the methods and systems particularly pointed out in the written description and claims hereof, as well as from the appended drawings.

In some implementations, the present disclosure provides systems and methods for selecting coffee cups or mugs of particular shapes with the objective of accentuating particular flavor notes in coffee as experienced by a user. In some aspects, the disclosed methods can be used both as a system for suggesting and experiencing flavor notes, as well as a game. In some aspects, a drinking vessel can include suggestive indicia formed or affixed thereon, and/or embedded therein, wherein the suggestive indicia suggests to the user to experience a particular flavor note or notes for a beverage, such as experiencing one or more coffee flavor notes when drinking coffee. In some aspects, the suggestive indicia can be located or revealed such that the user is reminded of the particular flavor note or notes that should have been experienced in the middle or at the conclusion of consuming the beverage involved. In some aspects, kits of mixed drinking vessel shapes may be provided having, for example, a plurality of drinking vessels, wherein a single coffee may be tasted in different vessels for the purpose of experiencing a particular set of flavor notes differently. In other aspects the drinking vessel would be provided as a set of one, or as a kit with a plurality of vessels of the same shape.

Detection of flavor notes by an individual while drinking coffee can be a somewhat subjective experience that is affected by an individual's physiology, memories (particularly memories associated with particular aromas and flavors) as well as other variables. For example, it is not unusual for two people drinking the same coffee brewed at the same time in the same shaped cup to have slightly different experiences in detecting flavor notes. However, Applicant believes that the shape of the cup or mug can affect the experiencing of flavor notes, and that this can be accentuated by suggestion. Thus, Applicant submits that, for example, for a roasted coffee that is established as having a strong tobacco or woody flavor note, an individual may experience these flavor notes more vividly using a cup of one shape more so than a cup with a different shape, particularly if they are encouraged to do so. The basis for this rests at least in part on the fact that individuals (some more than others) can be subject to the power of suggestion. Thus, for example, if an individual is told in advance that a particular cup (such as a cup of a certain shape) is likely to accentuate a particular flavor note, Applicant believes that the reticular activating system of the brain (a diffuse network of nerve pathways in the brainstem connecting the spinal cord, cerebrum, and cerebellum, and mediating the overall level of consciousness) is likely to "activate" and "search" for that particular flavor note after it is "suggested", resulting in an enhanced reaction and detection of that particular flavor note by the person having the experience. Related to and integral to this is the proposition that the olfactory sense is incredibly complex. It is Applicant's view that combining these effects of the olfactory, taste, differing physiology, individual memory, the objective attributes of the coffee itself, its preparation, and the power of suggestion, can ultimately cause a user to reproducibly experience the same flavor note. For some individuals, it is possible that this could additionally be influenced by the shape of the cup, or drinking vessel, that they are using, particularly if that cup or drinking vessel also includes "suggestive" indicia that suggests one or more flavor notes, wherein the user is coaxed, or "pre-suaded" so to speak, to experience that flavor note. Applicant believes that these psychological associations can be formed and reinforced over time, which can make for interesting gameplay, as well as an interesting way to experience the complexities of coffee. Moreover, Applicant also appreciates that these insights set forth herein can be used as a part of a game alone, with others, or even as a hobby or other pastime.

Accordingly, in some implementations, systems (both electronic and non-electronic) are provided, for example, for recommending a drinking vessel for experiencing one or more desired flavor notes in coffee. The coffee vessel may be an aesthetically pleasing vessel, such as those described in U.S. patent application Ser. No. 29/648,776, filed May 23, 2018, incorporated by reference herein, or any other identified drinking vessel. In some embodiments, a computerized system including a recommendation engine can be provided for use by a user. The user can input data into a GUI specifying, for example, the type of coffee the user is brewing or planning to brew. The user can also select one or more flavor notes that the user would like to experience, and/or the system can provide a GUI showing a listing of flavor notes characteristic of the coffee that the user has identified, after which the user can select one or more flavor notes that they are interested in experiencing. These user inputs are then transmitted to a server where they are parsed and analyzed via a microprocessor. Based on the inputs, the system is configured to then reference a database (e.g., a graph database) populated with data and/or relationships that correlates the coffee the user proposes to brew with one or more identified cup designs that are associated with one or more flavor notes that the user has selected. A responsive communication can be prepared and forwarded by the server to the user including one or more recommendations to try using one or more drinking vessels to sample the coffee. The user can then sample the coffee using at least one of the cups that the system identifies. The user can then provide additional feedback to the system to confirm which flavor notes, if any, were experienced. In some implementations, the application can guide the user to an online retailer or identify a physical store where a coffee having a particular flavor note or notes, drinking vessels and/or other accessories can be obtained. In other implementations, the application can guide the user to an online retailer or identify a physical store where a cup capable of accentuating a particular flavor note or notes can be obtained.

In accordance with a further aspect, a graphical user interface can be provided including a listing of all or some flavor notes of coffee. The GUI can present the flavor notes in any desired format. For example, the flavor notes can be provided as textual icons on virtual buttons, and/or icons that are suggestive of the flavor notes. Moreover, the flavor notes can be provided in the form of a wheel with colored radially sectioned icons, wherein each icon or subdivision of the wheel can be associated with a unique color, icon, and or textual matter that is either suggestive or descriptive of the flavor note of interest. The user can use such a GUI to select one or more flavor notes that they are interested in experiencing.

The disclosure also provides a plurality of cups (or other drinking vessels), each cup including indicia formed or affixed thereon or therein that can be used in cooperation with the aforementioned recommendation engine, for example. In various implementations, the indicia can include one or more of a word, a symbol, a decal, an inward or outward relief (depression(s) or bump(s) or ridge(s), for example) that suggest a beverage and/or one or more flavor note(s) to the user, such that the user utilizes the cup to drink a type of beverage therefrom in response to the suggestion of the indicia in order to experience a particular flavor note from the beverage. The indicia itself can be aromatic (configured to selectively release an aroma), can be a geometric shape, can be a temperature or chemical sensitive marking, and the like. The cups can be provided with sensors (chemically or electronically based, for example). These sensors can display a direct visual indication, for example, of acidity, temperature, and/or the presence of particular chemical compounds. The indicia can be conspicuous, or only evident after considerable examination or only evident after a set of conditions have occurred (e.g., a fixed amount of the beverage has been consumed or a temperature change has occurred). The sensors can similarly transmit information on one or more properties of the beverage (e.g., coffee) to a handheld electronic device, such as a smartphone.

For example, any aromatic or flavorful beverage can be drank from the cup in response to the suggestiveness of the indicia and suggest to the user the scent or flavor that the user might experience. The indicia can be located on a surface of the cup, for example, underneath the cup on the bottom of the cup, inside the cup, on the handle of the cup, or on the external surface of the cup. If provided on an interior surface of the cup, the indicia can be provided on the bottom inner surface of the cup, a bottom wall section of the inner surface of the cup, a medial wall section of the cup, or an upper wall section of the inner surface of the cup. The indicia can be provided on the outside of a handle of the cup, inside the handle, on the top, bottom, or middle of the handle, on the top rim of the cup, the bottom rim of the cup, or inside a depression defined on a bottom of the cup. The indicia can be integrated with or underneath the glaze, or over the glaze, in the case of a ceramic cup. The indicia can be any desired color. The indicia can be haptic or tactile, and include, for example, a series of bumps, numbers, letters or other typographical symbols, for example. Multiple indicia can be provided on each cup all provided in the same color, and that color can visually contrast from the portion of the cup that surrounds the indicia. Multiple indicia can be provided on the cup, for example, to remind the user of a particular flavor or flavor note prior to drinking from the cup (external indicia), while drinking from the cup (by placing indicia partially down an inside wall of the cup), and after the cup is empty (e.g., on the bottom interior surface of the cup).

The cups can be provided with information storage devices or indicia that identifies one or more flavor notes, and/or other information. For example, the cups can be provided with an information storage device or indicia, such as a 1D, 2D, or 3D bar code including information such as one or more flavor notes, a type of coffee that can be drank from the cup, and the like. Likewise, NFC tags and RFID tags can also be used to store or transmit this information. The RFID tag or NFC tag can be removably or non-removably attached to the cup. The bar code or NFC tag can be read with a reader, such as a smart phone, to identify the information in the bar code or NFC tag. The reader or smartphone can be configured to use a software application to accomplish the reading of the indicia, and the information can be displayed by the smartphone to the user, and/or to other users that are logged into the app simultaneously (such as if the users are all playing an online game together associated with the drinking vessels, such as to guess a flavor note), and/or the information can be sent to a central server where the information is then analyzed and used to perform a further function, such as recommend a drinking vessel, a type of coffee, or other product.

In accordance with further implementations, tasting cups or vessels can be provided that can collect and transmit data and process data. For example, a cup can be provided with sensors and the like to facilitate active recordation, and if desired, control of temperature and other parameters. The cup can be provided with an interactive display or other user interface to permit the user to log their experience and provide feedback, if desired. Such cups can be provided with or without sensors and with or without the ability for a user to provide feedback of various types through the vessel. Such devices can be similar to those set forth, for example, in U.S. Pat. Nos. 9,782,036, 9,801,482, 9,863,695 and 9,814,331, which are incorporated by reference herein in their entireties for any purpose whatsoever.

The disclosure also provides embodiments of a kit. The kit can be used alone, or in combination with the computerized recommendation engine or application as set forth above. The kit typically includes a plurality of drinking vessels on a base plate, such as those set forth in U.S. patent application Ser. No. 29/648,776, filed May 23, 2018, which is appended hereto. Each cup can be of a different shape and/or size, and each cup can be provided with one or more indicia as set forth above. The indicia can be suggestive, for example, of one or more flavor notes of a beverage to be experienced, such as flavor notes of coffee. In further implementations, the kit can be provided with one or more coffees or other infusible extracts, such as teas, to be used in cooperation with the plurality of cups, wherein users can brew coffee or tea and drink them from the cup in order to experience particular flavor notes. For example, if a plurality of coffees are provided, a user can mix them and brew them to experiment with trying to identify different flavor notes.

In further accordance with the disclosure, electronic and non-electronic games are provided including a plurality of drinking vessels including indicia as set forth above. An embodiment of an electronic game can include a plurality of users logged in to a common session of a game, wherein updates are provided to some or all players in real time. For example, a first user can be drinking from a predetermined mug, and the user needs to guess one or a plurality of flavor notes present in the coffee. The user can sample the coffee, and select the user notes that they experience. These entries by the user can be kept secret by the system, or can provide updates to other players in real time so that other players can see how the first user is progressing. In another implementation, all users participate, and the results are tallied at the end, resulting in a winner. In some implementations, the game can be associated with a commercial enterprise, and the commercial enterprise can provide a prize to the winner, such as reward points or complementary merchandise or services.

In some implementations, a user can select a coffee, and pick a cup based on a recommendation from a computer server or other source of information. The user can then drink the coffee from the cup, and record flavor notes detected by the user.

In further accordance with the disclosure, electronic and non-electronic data exchange are provided including a plurality of drinking vessels including indicia as set forth above. An embodiment of an electronic data exchange can include a plurality of users with cups exchanging information with a common data storage engine, wherein updates are provided to improve the suggestion of which cup to utilize with which coffee. The suggestion can occur with a delay or in real time. For example, a user can record the coffee being consumed in a predetermined mug, and then later suggest one or a plurality of flavor notes found to be present in the coffee; based on the flavors actually present in the coffee, the data engine can be updated to refine the suggestion for the cup to be used for a coffee of that type or that coffee in particular in the future. In some implementations, the system can be associated with a commercial enterprise, and the commercial enterprise can provide a prize for participation, such as reward points or complementary merchandise or services.

The disclosure further provides implementations of a computer-implemented method of determining relevance of a drinking vessel to at least one flavor in an infused extract. The method includes identifying, for at least one flavor, at least one suitable drinking vessel for accentuating the experience of the at least one flavor, and determining the relative importance of each of a plurality of drinking vessels relative to the at least one flavor, via at least one processor circuit. The at least one processor circuit is programmed to determine, for each respective drinking vessel, a relative flavor intensity score as compared to other drinking vessels that purport to accentuate the at least one flavor. The method further includes transmitting a recommendation of at least one drinking vessel to a user for experiencing the at least one flavor.

If desired, the infused extract can include brewed coffee. The flavor characteristic can include a flavor note selected from the SCAA flavor wheel. The infused extract can include brewed tea.

The disclosure further includes implementations of a computer implemented method of operating an online computerized social media platform for matching drinking vessels to infused extracts based on user selectable criteria. The method includes providing at least one processor circuit configured to provide an interface for user selection of a drinking vessel, and responsive to receiving user input selecting a drinking vessel, provide a recommendation of at least one infusible material for forming an infused extract to consume from the drinking vessel based on the user selectable criteria.

If desired, the user selectable criteria can include a brewing apparatus selected by the user. The user selectable criteria can include a flavor characteristic that the user wishes to experience, and the at least one processor circuit can be further programmed to provide the recommendation based at least in part on the flavor characteristic. The infusible material can include coffee or tea, for example. The flavor characteristic can include a flavor note selected from the SCAA flavor wheel.

The disclosure further includes a computer-implemented method of determining relevance of an infusible material to a drinking vessel based on user selectable criteria. The method includes identifying for a selected drinking vessel, at least one infusible material for forming an infused extract to consume from the drinking vessel based on the user selectable criteria via at least one processor circuit. The circuit is programmed to determine, for each said at least one respective infusible material, a relative score as compared to other infusible materials based on the user selectable criteria. The method further includes transmitting a recommendation of at least one infusible material to a user.

If desired, the user selectable criteria can include caffeine content of infusible material, or a brewing apparatus selected by the user, for example. In a further implementation, the user selectable criteria can include a flavor characteristic that the user wishes to experience, and the at least one processor circuit can be further programmed to determine the relative score based at least in part on the flavor characteristic.

If desired, the infusible material can include coffee or tea. The flavor characteristic can be a flavor note selected from the SCAA flavor wheel. In a further implementation, the method can further include providing at least one brewing recommendation.

The disclosure further provides a game of guessing a flavor contained in a particular infused extract. The game includes a plurality of drinking vessels of different shapes. The drinking vessels can include at least one indicia for suggesting a flavor note to experience when drinking coffee from said drinking vessels. The game can be played by a participant drinking infused extract from at least one of the drinking vessels, and then guessing what flavor the drinking vessel relates to.

It is to be understood that the foregoing general description and the following detailed description are exemplary and are intended to provide further explanation of the disclosed embodiments. The accompanying drawings, which are incorporated in and constitute part of this specification, are included to illustrate and provide a further understanding of the disclosed methods and systems. Together with the description, the drawings serve to explain principles of the disclosure. It is also understood that while the principles are described being applied to coffee cups, the application is extended to any beverage wherein complex flavor notes are present, and experiencing those flavor notes should provide value to the user, including in wine, beer, spirits, tea, juice and water.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure.

DETAILED DESCRIPTION

Reference will now be made in detail to the present preferred embodiments of the disclosure, examples of which are illustrated in the accompanying drawings. The methods and corresponding steps of the disclosed embodiments will be described in conjunction with the detailed description of the system.

In accordance with some implementations, the disclosure provides computer-implemented methods of making recommendations of drinking vessels for infused extracts, such as coffees, as well as making recommendations of infusible material for making infused extracts, which can be based at least in part on a drinking vessel to be used to consume the infused extract.

Figure 1:
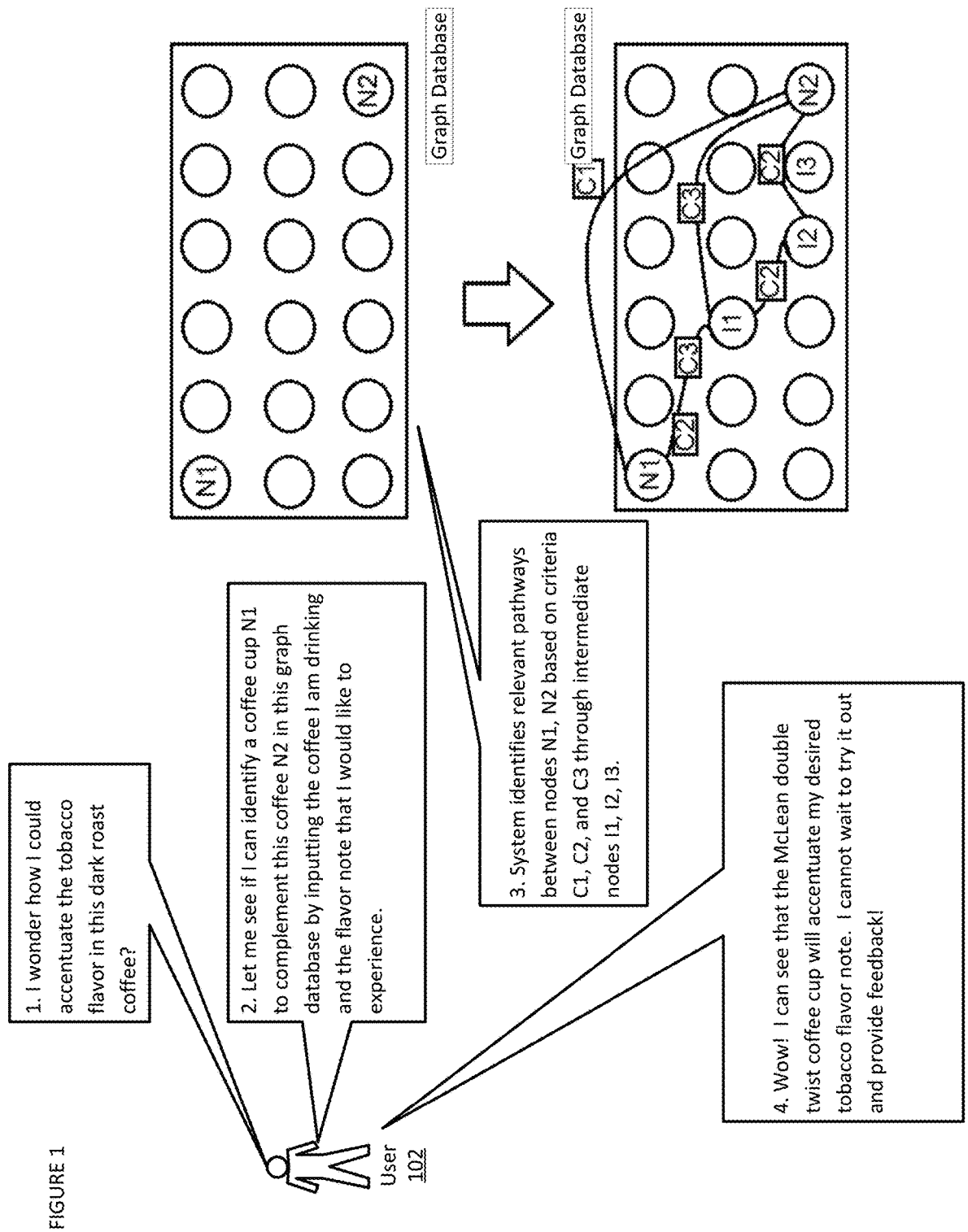
FIG. 1 shows an exemplary usage scenario of a computerized recommendation engine for recommending drinking vessels in accordance with the disclosure.

For purposes of illustration, and not limitation, FIG. 1 shows an exemplary usage scenario of a system in accordance with the disclosure. In FIG. 1, a user 102 may utilize an embodiment of the disclosed system to seek feedback as to a type of cup to use in order to accentuate the experience of a flavor note in a particular coffee. The user may input the coffee the user plans to brew and one or more flavor notes that the user wishes to experience into the GUI. Each of the coffee and a plurality of drinking vessels can be associated with nodes N1, N2 in a database, such as a graph database, relational database, or other database structured to recognize relationships between the coffees and drinking vessels, for example. The user may then specify additional desired criteria C1, C2, C3 that could be used to link the coffee to the vessel, such as flavor notes to be detected. When actuated based on these inputs, the system then analyzes the relevance of the coffee that has been identified with respect to the drinking vessels (e.g., coffee cups) in the database based on the flavor note criteria. The system then may show a graphic, or other output that sets forth the relevance of the coffee with respect to the drinking vessels. It will be appreciated that each drinking vessel can be assigned a score based its relevance to detecting the selected flavor notes.

Figure 2:
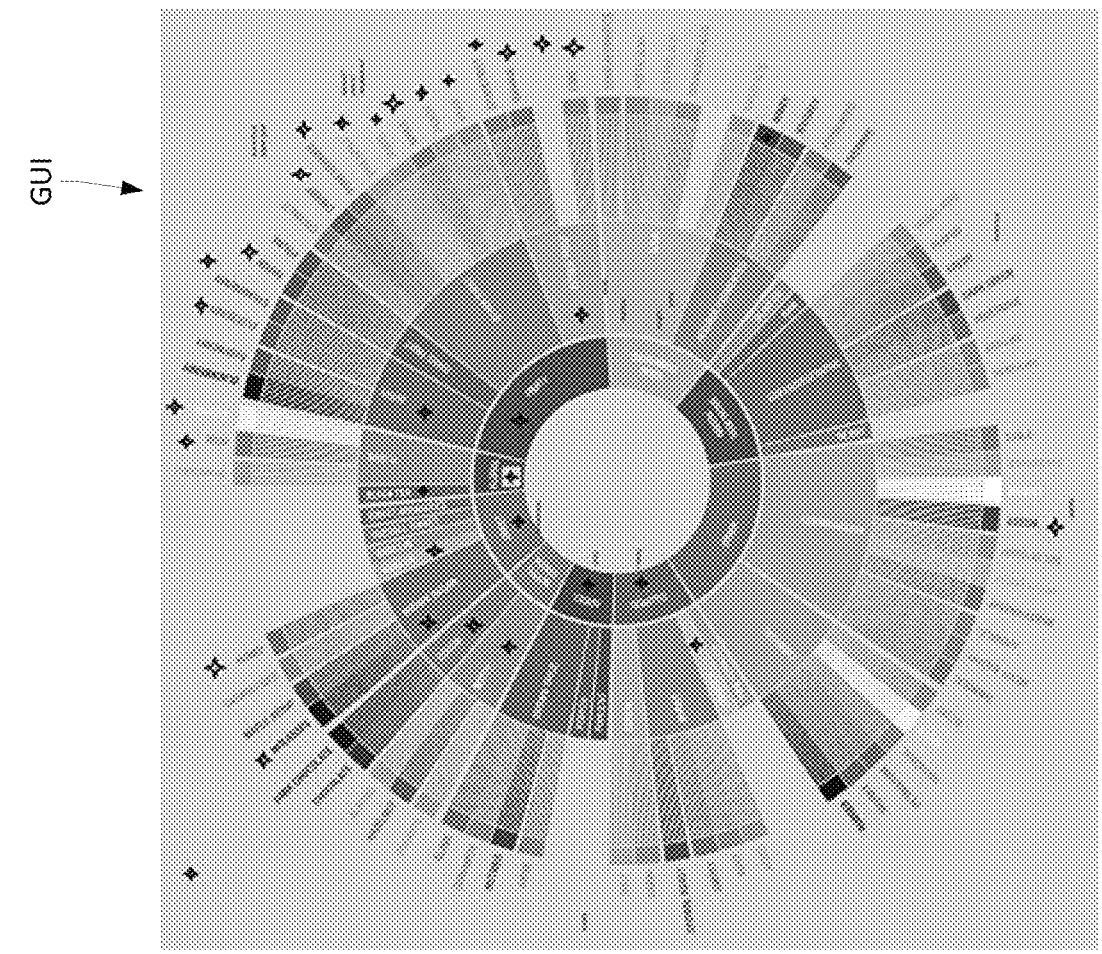
FIG. 2 illustrates an example of a graphical user interface in accordance with the disclosure.

FIG. 2 illustrates an example graphical user interface (GUI), which can include a selection interface for selecting one or more flavor notes that a user wishes to experience. As illustrated, the graphical user interface may display different flavor notes for coffee, in this example, in the format of a wheel, as illustrated, or in any other format. The GUI may display in a second portion of the display (not shown) a relative ranking, or score, of drinking vessels in its database with respect to a particular coffee that has been identified by the user. Each of the flavor notes or vessels can be color coded according to relevance scores, or other criteria. Also, each of the respective scores may be color coded on the GUI to illustrate the relative ranking, as one example, or, a particular cup with respect to particular flavor notes.

Figure 3:
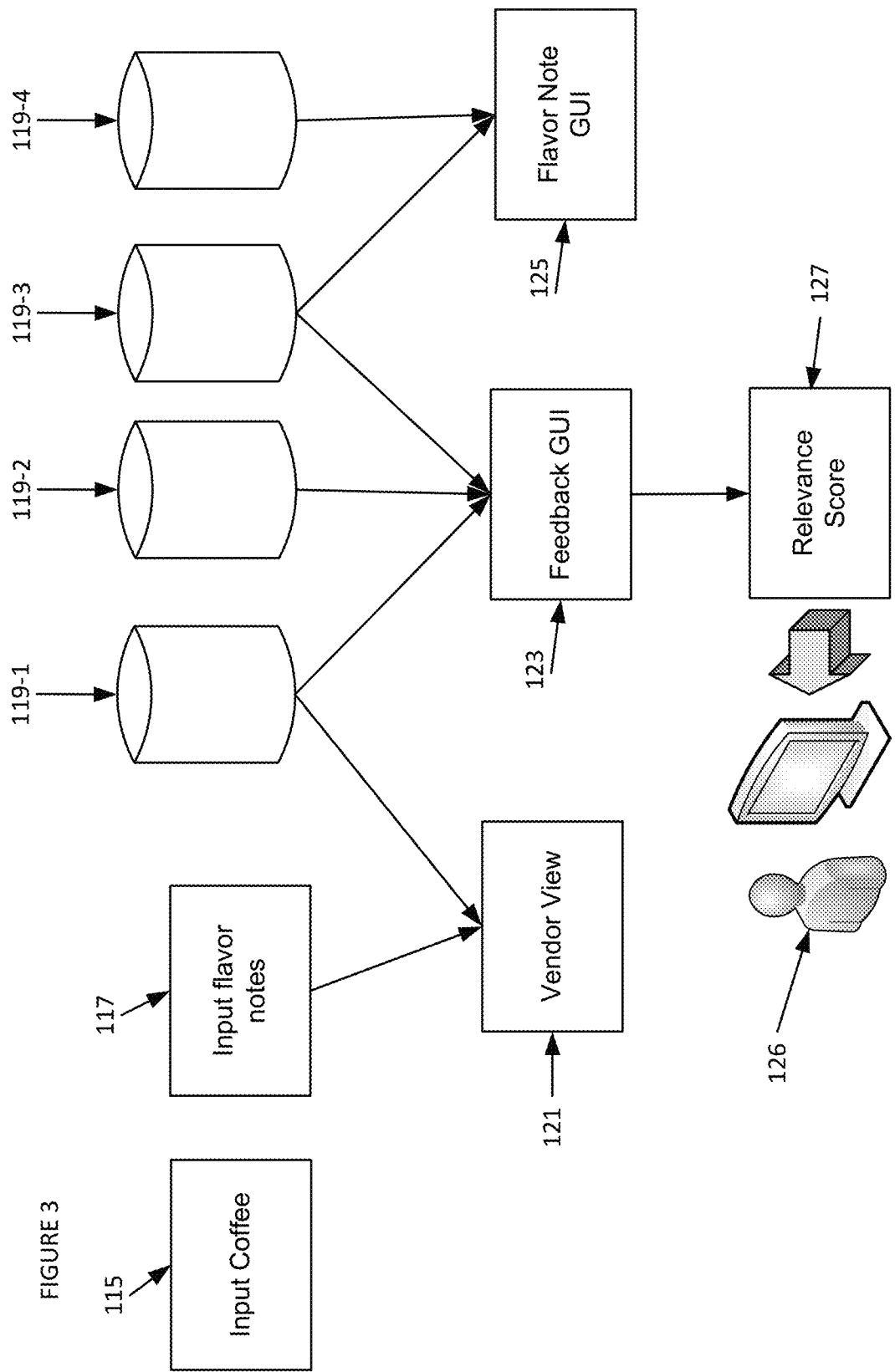
FIG. 3 shows an example process flow for recommending a drinking vessel and providing user feedback in accordance with the disclosure.

FIG. 3 shows a process flow for generating a graphical user interface and providing recommendation information for a drinking vessel. As discussed herein, information from at least one database (e.g., databases 119-1, 119-2, 119-3, and 119-4, collectively referred to herein as databases 119) structured to recognize relations between flavors, infusible materials, and drinking vessels that can be used to determine relevance scores for detecting different coffee flavor notes for a particular infusible material or infused extract. At 115, a user may input, such as via an apparatus comprising a memory and a processor in communication with memory (e.g., smart phone), a coffee that the user wishes to brew. The user may also input, via the apparatus, flavor notes 117. Responsive to receipt of these inputs, instructions may be executed to retrieve from the databases 119, information regarding appropriate drinking vessels relating to each of the input flavor notes, wherein the vessels are believed to accentuate the actual flavor notes. For example, the user device may receive from database 119-1, information on one or more drinking vessels for each respective flavor note determined to be detectable in the coffee. The user device may receive from database 119-2, information about each respective flavor note including identifiers and flavor classification, and from database 119-3, information related to drinking vessels. Yet further, the user device may receive from database 119-4, information about different coffees that provide similar flavor notes or a similar flavor profile. As such, the user device may receive from the databases 119, information regarding similar coffees as well as the nearest location where the user can obtain such coffees, for example, after reading location information from the user's onboard GPS device if the user is using a smartphone. Using the information received, the user may select one or more cups to try to use, and order those cups or vessels through the Internet, wherein the system can provide recommendations for locations to purchase the drinking vessels.

As illustrated in the process flow of FIG. 3, a plurality of GUIs/displays may be generated. For example, the user device may generate for display on a graphical user interface, a first display 125 including a list of flavor notes that can be detected in the coffee that the user intends to brew. A recommendation view can display the drinking vessels in the database determined to be most relevant to the tasting notes. The user device may generate a second display 123 including input fields in which the user can provide feedback, indicating which flavor notes the user experienced. The user device may generate a third display 121 including information on vendors from which drinking vessels can be obtained, or to participate in an online discussion forum to share coffee brewing experiences vis-à-vis flavor note detection. Each of the different displays 121, 123 and 125 may be separate, independent displays on a graphical user interface. From the displays 121, 123, and 125, a fourth display 127, which may include, for example, a relevance score for each respective drinking vessel may be provided on the user interface.

Figure 4:
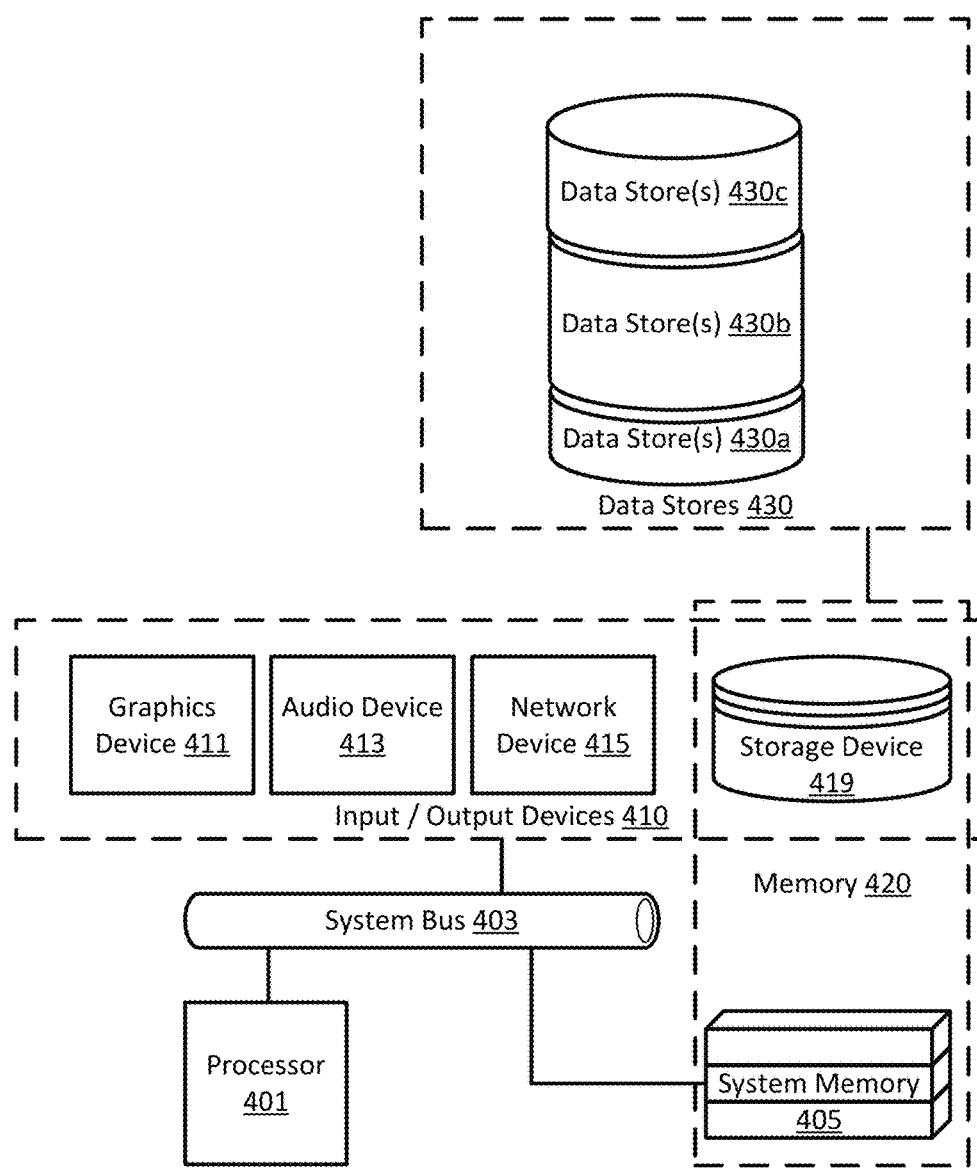
FIG. 4 shows a block diagram illustrating an exemplary system coordinator in one embodiment of the disclosure.

FIG. 4 shows a block diagram illustrating an exemplary system coordinator in one embodiment of the disclosure. The system coordinator, such as may be implemented on a client (e.g. user) device. The system coordinator facilitates the determination of relative importance of particular drinking vessels with respect to particular flavor notes via a computer system (e.g., one or more cloud computing systems, grid computing systems, virtualized computer systems, mainframe computers, servers, clients, nodes, desktops, mobile devices such as smart phones, cellular phones, tablets, personal digital assistants (PDAs), and/or the like, embedded computers, dedicated computers, a system on a chip (SOC)). For example, the system coordinator may receive, obtain, aggregate, process, generate, store, retrieve, send, delete, input, output, and/or the like data (including program data and program instructions); may execute program instructions; and may communicate with computer systems, nodes, users, and/or the like. In various embodiments, the system coordinator may comprise a standalone computer system, a distributed computer system, a node in a computer network (i.e., a network of computer systems organized in a topology), a network of system coordinators, and/or the like. It is to be understood that the system coordinator and/or the various system coordinator elements (e.g., processor, system bus, memory, input/output devices) may be organized in any number of ways (i.e., using any number and configuration of computer systems, computer networks, nodes, system coordinator elements, and/or the like) to generate a relevance score evidencing a particular drinking vessel to a particular flavor note, for example, in accordance with the disclosure. Furthermore, it is to be understood that the various coordinator computer systems, coordinator computer networks, coordinator nodes, coordinator elements, and/or the like may communicate among each other in any number of ways to facilitate system operation. As used in this disclosure, the term "administrator" or "user" refers generally to people and/or computer systems that interact with the system; the term "server" refers generally to a computer system, a program, and/or a combination thereof that handles requests and/or responds to requests from clients via a computer network; the term "client" refers generally to a computer system, a program, a user, and/or a combination thereof, such as a smartphone, that generates requests and/or handles responses from servers via a computer network; the term "node" refers generally to a server, to a client, and/or to an intermediary computer system, program, and/or a combination thereof that facilitates transmission of and/or handling of requests and/or responses.

The system coordinator includes a processor 401 that executes program instructions (e.g., system program instructions). The processor may be implemented using integrated circuits (ICs), application-specific integrated circuits (ASICs), field-programmable gate arrays (FPGAs), and/or the like. The processor may be connected to system memory 405 via a system bus 403. The system bus may interconnect these and/or other elements of the system coordinator via electrical, electronic, optical, wireless, and/or the like communication links. In various embodiments, the system bus may comprise one or more control buses, address buses, data buses, memory buses, peripheral buses, and/or the like. The processor may access, read from, write to, store in, erase, modify, and/or the like, the system memory in accordance with program instructions executed by the processor. The system memory may facilitate accessing, storing, retrieving, modifying, deleting, and/or the like data by the processor.

In various embodiments, input/output devices 410 may be connected to the processor and/or to the system memory, and/or to one another via the system bus. In some embodiments, the input/output devices may include one or more graphics devices 411. The processor may make use of the one or more graphic devices in accordance with program instructions (e.g., system program instructions) executed by the processor. The graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 413. The processor may make use of the one or more audio devices in accordance with program instructions (e.g., system program instructions) executed by the processor. In one implementation, an audio device may be a sound card that may obtain (e.g., via a connected microphone), process, output (e.g., via connected speakers), and/or the like audio data (e.g., system data). The audio device may be discreet, external, embedded, integrated into a motherboard, and/or the like. An audio device may operate in combination with other audio devices (e.g., in parallel) to provide improved capabilities, data throughput, audio quality, and/or the like.

In some embodiments, the input/output devices may include one or more network devices 415. The processor may make use of the one or more network devices in accordance with program instructions (e.g., system program instructions) executed by the processor. In one implementation, a network device may be a network card that may obtain, process, output, and/or the like network data (e.g., system data). The network device may be discreet, external, embedded, integrated into a motherboard, and/or the like. The network device may operate in combination with other network devices (e.g., in parallel) to provide improved data throughput, redundancy, and/or the like. In some embodiments, the input/output devices may include one or more storage devices 419. The processor may access, read from, write to, store in, erase, modify, and/or the like a storage device in accordance with program instructions (e.g., system program instructions) executed by the processor. A storage device may facilitate accessing, storing, retrieving, modifying, deleting, and/or the like data (e.g., system data) by the processor. In one implementation, the processor may access data from the storage device directly via the system bus. In another implementation, the processor may access data from the storage device by instructing the storage device to transfer the data to the system memory and accessing the data from the system memory.

The storage device 419 may be discreet, external, embedded, integrated (e.g., into a motherboard, into another storage device), and/or the like. A storage device 419 may operate in combination with other storage devices to provide improved capacity, data throughput, data redundancy, and/or the like. Together and/or separately the system memory 405 and the one or more storage devices 419 may be referred to as memory 420 (i.e., physical memory).

System memory 420 contains processor-operable (e.g., accessible) system data stores 430. Data stores 430 comprise data that may be used (e.g., by the system) via the system coordinator. Such data may be organized using one or more data formats such as a database (e.g., a relational database with database tables, an object-oriented database, a graph database, a hierarchical database), a flat file (e.g., organized into a tabular format), a binary file (e.g., a GIF file, an MPEG-4 file), a structured file (e.g., an HTML file, an XML file), a text file, and/or the like. Data stores 430 may comprise a non-transitory machine readable medium storing instructions executable by processor 401 to perform a specified function. Accordingly, each of the respective data stores 430a-430c include programmatic instructions which, when executed by processor 701, provide for determination of a relative importance score for each respective drinking vessel with respect to particular coffee flavor notes in accordance with the present disclosure.

Data stores 430a-430c may also include instructions executable by processor 401 to generate for display on a graphical user interface a first display including a list of flavor notes, and a second display including a list of suitable drinking vessels for detecting the flavor notes. The data stores 430a-430c may also include instructions executable by processor 401 to generate for display on a graphical user interface a third display including vendor information for acquiring particular drinking vessels or coffee. In some examples, the data stores 430a-430c include instructions executable by processor 401 to receive as data input, a list of the flavor notes and coffee being used, or the drinking vessel being used and other user selectable criteria, such as a flavor note to be experienced, and retrieve the pertinent identification information for drinking vessels, or an infusible material to be tried in a given drinking vessel to experience a given flavor note, for example. In some examples, the data stores 430a-430c include instructions executable by processor 401 to retrieve from at least one database structured to recognize relations between the flavor notes and the drinking vessels, information regarding suppliers of pertinent goods, and the like. In some examples, the data stores 430a-430c include instructions executable by processor 401 to generate a display including the relevance score for each respective drinking vessel in the database, wherein each of the entities is color coded to illustrate a respective importance with regard to the other possible alternatives.

Data may be organized using one or more data structures such as an array, a queue, a stack, a set, a linked list, a map, a tree, a hash, a record, an object, a directed graph, and/or the like. In various embodiments, data stores may be organized in any number of ways (i.e., using any number and configuration of data formats, data structures, system coordinator elements, and/or the like) to facilitate system operation. For example, system data stores may comprise data stores 430a-c implemented as one or more databases.

The entirety of this disclosure (including the written description, figures, claims, abstract, appendices, and/or the like) shows various embodiments via which the claimed innovations may be practiced. It is to be understood that these embodiments and the features they describe are a representative sample presented to assist in understanding the claimed innovations, and are not exhaustive and/or exclusive. As such, the various embodiments, implementations, examples, and/or the like are deemed non-limiting throughout this disclosure.

Furthermore, alternate undescribed embodiments may be available (e.g., equivalent embodiments). Such alternate embodiments have not been discussed in detail to preserve space and/or reduce repetition. That alternate embodiments have not been discussed in detail is not to be considered a disclaimer of such alternate undescribed embodiments, and no inference should be drawn regarding such alternate undescribed embodiments relative to those discussed in detail in this disclosure. It is to be understood that such alternate undescribed embodiments may be utilized without departing from the spirit and/or scope of the disclosure. For example, the organizational, logical, physical, functional, topological, and/or the like structures of various embodiments may differ. In another example, the organizational, logical, physical, functional, topological, and/or the like structures of the system coordinator, system coordinator elements, system data stores, system components and their subcomponents, capabilities, applications, and/or the like described in various embodiments throughout this disclosure are not limited to a fixed operating order and/or arrangement, instead, all equivalent operating orders and/or arrangements are contemplated by this disclosure. In yet another example, the system coordinator, system coordinator elements, system data stores, system components and their subcomponents, capabilities, applications, and/or the like described in various embodiments throughout this disclosure are not limited to serial execution, instead, any number and/or configuration of threads, processes, instances, services, servers, clients, nodes, and/or the like that execute in parallel, concurrently, simultaneously, synchronously, asynchronously, and/or the like is contemplated by this disclosure. Furthermore, it is to be understood that some of the features described in this disclosure may be mutually contradictory, incompatible, inapplicable, and/or the like, and are not present simultaneously in the same embodiment. Accordingly, the various embodiments, implementations, examples, and/or the like are not to be considered limitations on the disclosure as defined by the claims or limitations on equivalents to the claims.

This disclosure includes innovations not currently claimed. Applicant reserves all rights in such currently unclaimed innovations including the rights to claim such innovations and to file additional provisional applications, non-provisional applications, continuation applications, continuation-in-part applications, divisional applications, and/or the like. It is to be understood that while some embodiments of the system discussed in this disclosure have been directed to various systems and methods, the innovations described in this disclosure may be readily applied to a wide variety of other fields and/or applications.

What is claimed is:

1. A computer-implemented method of determining relevance of a drinking vessel to at least one flavor in an infused extract, the method comprising:
    identifying for at least one flavor, at least one suitable drinking vessel for accentuating the experience of the at least one flavor, and determining the relative importance of each of a plurality of drinking vessels relative to the at least one flavor via at least one processor circuit programmed to:
    determine, for each respective drinking vessel:
        a relative flavor intensity score as compared to other drinking vessels that purport to accentuate the at least one flavor; and transmit a recommendation of at least one drinking vessel to a user for experiencing the at least one flavor.

2. The computer implemented method of claim 1, wherein the infused extract includes brewed coffee.

3. The computer implemented method of claim 2, wherein the flavor characteristic is a flavor note selected from the SCAA flavor wheel.

4. The computer implemented method of claim 1, wherein the infused extract includes brewed tea.

5. A computer implemented method of operating an online computerized social media platform for matching drinking vessels to infused extracts based on user selectable criteria, the method comprising providing at least one processor circuit configured to:
provide an interface for user selection of a drinking vessel; and
responsive to receiving user input selecting a drinking vessel, provide a recommendation of at least one infusible material for forming an infused extract to consume from the drinking vessel based on the user selectable criteria.

6. The computer implemented method of claim 5, wherein the user selectable criteria includes a brewing apparatus selected by the user.

7. The computer implemented method of claim 5, wherein the user selectable criteria includes a flavor characteristic that the user wishes to experience, and further wherein the at least one processor circuit is further programmed to provide the recommendation based at least in part on the flavor characteristic.

8. The computer implemented method of claim 7, wherein the infusible material includes coffee.

9. The computer implemented method of claim 8, wherein the flavor characteristic is a flavor note selected from the SCAA flavor wheel.

10. The computer implemented method of claim 7, wherein the infusible material includes tea leaves.

11. A computer-implemented method of determining relevance of an infusible material to a drinking vessel based on user selectable criteria, the method comprising:
identifying for a selected drinking vessel, at least one infusible material for forming an infused extract to consume from the drinking vessel based on the user selectable criteria via at least one processor circuit programmed to:
determine, for each said at least one respective infusible material:
a relative score as compared to other infusible materials based on the user selectable criteria; and
transmit a recommendation of at least one infusible material to a user.

12. The computer implemented method of claim 11, wherein the user selectable criteria includes caffeine content of infusible material.

13. The computer implemented method of claim 11, wherein the user selectable criteria includes a brewing apparatus selected by the user.

14. The computer implemented method of claim 11, wherein the user selectable criteria includes a flavor characteristic that the user wishes to experience, and further wherein the at least one processor circuit is further programmed to determine the relative score based at least in part on the flavor characteristic.

15. The computer implemented method of claim 14, wherein the infusible material includes coffee.

16. The computer implemented method of claim 15, wherein the flavor characteristic is a flavor note selected from the SCAA flavor wheel.

17. The computer implemented method of claim 14, wherein the infusible material includes tea leaves.

18. The computer implemented method of claim 11, further comprising providing at least one brewing recommendation.

* * * * *